US012767123B2

(12) United States Patent
Ewald

(10) Patent No.: US 12,767,123 B2
(45) Date of Patent: Oct. 20, 2026

(54) METHOD, COMPUTER PROGRAM PRODUCT, PARKING ASSISTANCE SYSTEM, AND VEHICLE

(71) Applicant: VALEO SCHALTER UND SENSOREN GMBH, Bietigheim-Bissingen (DE)

(72) Inventor: Stefan Ewald, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 11 days.

(21) Appl. No.: 18/864,840

(22) PCT Filed: Apr. 27, 2023

(86) PCT No.: PCT/EP2023/061065
§ 371 (c)(1),
(2) Date: Nov. 11, 2024

(87) PCT Pub. No.: WO2023/217538
PCT Pub. Date: Nov. 16, 2023

(65) Prior Publication Data

US 2025/0333049 A1 Oct. 30, 2025

(30) Foreign Application Priority Data

May 11, 2022 (DE) ..................... 10 2022 111 724.3

(51) Int. Cl.
*G08G 1/08* (2006.01)
*B60W 30/06* (2006.01)
(Continued)

(52) U.S. Cl.
CPC ............ *B60W 30/06* (2013.01); *B60W 50/14* (2013.01); *B60W 60/001* (2020.02);
(Continued)

(58) Field of Classification Search
CPC .... B60W 30/06; B60W 50/14; B60W 60/001; B60W 2050/146; B60W 2420/403;
(Continued)

(56) References Cited

U.S. PATENT DOCUMENTS

2018/0129218 A1 5/2018 Kato et al.
2018/0194344 A1 * 7/2018 Wang ..................... G05D 1/027
(Continued)

FOREIGN PATENT DOCUMENTS

DE 10 2010 051 206 A1 5/2012
DE 10 2013 015 349 A1 4/2014
(Continued)

OTHER PUBLICATIONS

Office Action in corresponding Japanese Application No. 2024-566356, dated Nov. 28, 2025 (8 pages).
(Continued)

*Primary Examiner* — Tai T Nguyen
(74) *Attorney, Agent, or Firm* — Osha Bergman Watanabe & Burton LLP

(57) ABSTRACT

A method for operating a parking assistance system for a vehicle, where the parking assistance system autonomously tracks a trajectory from a number of trajectories learned in a training mode. The respective trajectory is determined by a sequence of positions and connects a starting position to a target position. The respective trajectory is assigned a number of images of an environment of the vehicle captured by the vehicle's camera in the respective position and stored. The method includes providing a number of stored images; determining a display element having the provided images to represent the respective associated trajectory; outputting the determined display element to a display device of a user interface of the vehicle; receiving a user input for selecting at least one image contained in the display element via the
(Continued)

user interface; and initiating an autonomous journey of the vehicle along the trajectory associated with the selected image.

15 Claims, 7 Drawing Sheets

(51) Int. Cl.
*B60W 50/14* (2020.01)
*B60W 60/00* (2020.01)

(52) U.S. Cl.
CPC . *B60W 2050/146* (2013.01); *B60W 2420/403* (2013.01); *B60W 2540/215* (2020.02); *B60W 2556/40* (2020.02)

(58) Field of Classification Search
CPC ....... B60W 2540/215; B60W 2556/40; B60W 40/02; B60W 60/0025; B62D 15/0285; B60Y 2300/06
USPC ........................................................ 340/932.2
See application file for complete search history.

(56) References Cited

U.S. PATENT DOCUMENTS

| | | | | |
|---|---|---|---|---|
| 2018/0246515 | A1* | 8/2018 | Iwama | G05D 1/0251 |
| 2018/0265130 | A1 | 9/2018 | Derendarz et al. | |
| 2018/0292829 | A1* | 10/2018 | Li | G01S 5/0264 |
| 2018/0345955 | A1* | 12/2018 | Kim | B62D 15/0285 |
| 2019/0184981 | A1 | 6/2019 | Jung et al. | |
| 2021/0354686 | A1* | 11/2021 | Pan | G01S 15/08 |
| 2022/0274588 | A1* | 9/2022 | Marek | B62D 15/0285 |
| 2023/0219598 | A1* | 7/2023 | Yoon | B60R 11/04 701/25 |

FOREIGN PATENT DOCUMENTS

| | | | |
|---|---|---|---|
| DE | 10 2015 010 746 | A1 | 3/2016 |
| DE | 10 2019 211 681 | A1 | 2/2021 |
| DE | 10 2015 217 489 | B4 | 10/2021 |
| JP | 2013530867 | A | 8/2013 |
| KR | 20200069334 | A | 6/2020 |
| KR | 20210002228 | A | 1/2021 |
| WO | 2020196676 | A1 | 10/2020 |
| WO | 2021104475 | A1 | 6/2021 |

OTHER PUBLICATIONS

International Search Report Issued in Corresponding PCT Application No. PCT/EP2023/061065, dated Aug. 17, 2023 (6 Pages with English Translation).
Written Opinion of the International Search Authority issued in Corresponding PCT Application No. PCT/EP2023/061065 dated Aug. 17, 2024 (7 Pages).
Office Action Issued in Corresponding German Application No. 102022111724.3 dated Mar. 2, 2023 (8 Pages).
Office Action issued by the Korean Patent Office for corresponding Korean Patent Application No. 2024-7037303, mailed Mar. 3, 2026 (14 pages).

* cited by examiner

METHOD, COMPUTER PROGRAM PRODUCT, PARKING ASSISTANCE SYSTEM, AND VEHICLE

The present invention relates to a method for operating a parking assistance system, a computer program product, a parking assistance system and a vehicle having a parking assistance system.

Parking assistance systems are known that can be trained to follow a specific trajectory. This is useful in particular for frequently recurring situations, such as for example parking the vehicle in a garage or parking the vehicle in a predetermined parking space. The driver then need only drive the vehicle to close to a starting point on the trajectory, for example to a driveway entrance. The parking assistance system then autonomously follows the practiced trajectory, and so the driver is relieved of load.

Over a longer period of use of the vehicle and/or when there are multiple people using the vehicle, a large number of different practiced trajectories can accumulate over time. This leads to the problem that a user can lose track in view of the large number and then no longer knows which of the trajectories is the one they want in a specific situation. In particular when different people use the vehicle alternately, a later user does not know what target a trajectory stored by a previous user has and/or what path said trajectory takes. Furthermore, when there are multiple trajectories whose paths are in the same area, such as for example on or by a property of the user, it is difficult for the user to distinguish them from one another.

One option is to assign keywords and/or a description to the different trajectories so that a user can distinguish them from one another. However, this is complex, not very intuitive and moreover does not solve the problem when there are multiple different users of a vehicle. If a user cannot uniquely associate a trajectory, this can firstly result in the user selecting the wrong trajectory to follow in a given situation, resulting in the vehicle not travelling to the desired parking position. The user must then either park the vehicle manually or else tries other trajectories, hoping to select the right one. Ultimately, this situation leads to unnecessary consumption of resources, such as fuel and time, and to user dissatisfaction. Such a lack of associability in the practiced trajectories can lead to the overall discouragement of users to use the parking assistance system, thereby reducing the benefit of the parking assistance system.

DE 10 2015 010 746 A1 discloses a method for self-localization of a vehicle. It involves an image capture unit, the coverage of which includes the ground in the environment of the vehicle, being used to record images, along a first trajectory, of the ground that is being driven over and to compare said images with position-related stored images, and the comparison is taken as a basis for determining a current position and/or a current orientation of the vehicle.

DE 10 2013 015 349 A1 discloses a method for operating a vehicle in order for the vehicle to approach a parking space in a parking area that is not visible/off-road, said method involving collecting environmental data pertaining to the vehicle, wherein approaching a parking space in the parking area results in it being identified whether said parking space is a home parking space or the parking area is a home parking area, and environmental data or driving data collected when the home parking space or home parking area is identified and the vehicle approaches the identified home parking space, or the identified home parking area, are stored or updated.

Against this background, one object of the present invention is to improve the operation of a parking assistance system.

According to a first aspect, a method for operating a parking assistance system for a vehicle is proposed. In a follow mode the parking assistance system is configured to autonomously follow a trajectory from a number of trajectories taught in a training mode, wherein the respective trajectory is defined by a sequence of positions and connects a starting position to a target position, and wherein the respective trajectory has an associated and stored number of images, captured by an on-board camera, of an environment of the vehicle at the respective position. The method comprises the steps of:

- delivering a number of stored images,
- determining a display that includes the delivered images to represent the respective associated trajectory,
- outputting the determined display to a display device of a user interface of the vehicle,
- receiving a user input to select at least one image contained in the display from the user interface, and
- initiating an autonomous travel of the vehicle along the trajectory associated with the selected image.

The advantage of this method is that a respective user can intuitively recognize from the display of the images what the trajectory is, to what target position said trajectory leads and/or what path said trajectory takes. This is true in particular even if multiple users use the vehicle alternately and therefore may not have practiced a respective trajectory with the vehicle themselves. This results in the advantage that users can select the right trajectory in a respective situation, and thus successfully complete the autonomous parking maneuver, with greater reliability. Selection of the wrong trajectory can be avoided, and thus also the effort involved in parking the vehicle in an unwanted parking position. In addition, the method saves the user the effort of assigning metadata, such as a title, keywords and/or a description, to the respective trajectory. In addition, it is not necessary to store such metadata to identify the respective trajectory, which reduces memory requirements.

The parking assistance system being configured to autonomously follow the respective trajectory is understood herein to mean that the parking assistance system autonomously controls the vehicle. This is accomplished herein in particular by using camera images, lidar data and/or radar data pertaining to the environment of the vehicle. Based on these images or data, the parking assistance system can, for example, localize and orient itself (this can also be referred to as SLAM, SLAM: Simultaneous Localization And Mapping) and may be configured to detect obstacles in the environment. The vehicle having the parking assistance system can also be referred to as a self-driving vehicle. There may be provision for the autonomous control to be carried out under the supervision of the user, the user not necessarily having to be in the vehicle.

The level of automation of the vehicle has, for example, an automation level 4 or 5 according to the SAE classification system. The SAE classification system was published in 2014 by SAE International, a standardization organization for motor vehicles, as J3016, "Taxonomy and Definitions for Terms Related to On-Road Motor Vehicle Automated Driving Systems." It is based on six different levels of automation and takes into account the degree of system intervention required and the degree of driver attention required. The SAE levels of automation range from level 0, which corresponds to a fully manual system, through driver assistance systems on levels 1 to 2, to semiautonomous (levels 3 and 4) and fully autonomous (levels 5) systems, where a driver is no longer required. The autonomous vehicle is a vehicle that is capable of sensing its environment and navigating without human input. It corresponds in particular to SAE automation level 5.

When teaching or practicing the respective trajectory in the training mode, the user preferably controls the vehicle manually. The user can also be assisted by the parking assistance system, but the vehicle is not driven autonomously by means of the parking assistance system. The user of the vehicle has full control of the vehicle. The trajectory to be taught is unknown at this time and is determined only when the training run is carried out.

In preferred embodiments, the parking assistance system is configured to follow the respective trajectory by using images of the environment of the vehicle that are captured by the on-board camera. This is understood to mean in particular that the parking assistance system executes a VSLAM algorithm (VSLAM: Visual Simultaneous Localization And Mapping) by using the captured image for orientation in the environment, in particular to localize the vehicle in relation to the positions on the respective trajectory.

The respective trajectory is defined in particular by a sequence of positions. In particular, the trajectory includes one or more reference positions. Reference positions correspond in particular to the positions that the vehicle has in the training mode when an image, lidar data and/or radar data pertaining to the environment are received and processed in order to determine features in the environment, such as optical features, which can also be referred to as orientation features. A respective reference position has a respective associated group of determined features. This means that the reference positions are defined while the trajectory is being taught. For example, a respective reference position is defined by two coordinates in a two-dimensional coordinate system and the orientation of the vehicle at this position. For example, the respective trajectory begins at a starting position, which is in particular a reference position, and ends at a target position, which is in particular also a reference position.

The number of trajectories includes one trajectory or multiple trajectories. The multiple trajectories may be situated in the same regions or areas, for example close to one another, or in different regions or areas. By way of example, a user can teach multiple trajectories on private property and other trajectories at their workplace, a station, a shopping center and the like.

The number of images associated with the respective trajectory can include one image, two images or more than two images for the respective trajectory. The images are captured and stored in particular while the trajectory is being taught. The respective image shows in particular a detail from the environment of the vehicle, the detail depending on the position at which the vehicle was situated at the time of capture of the image, how it was oriented and what angle of view the camera used has. By way of example, a respective position on the trajectory has a particular associated image in which the position itself can be seen. Alternatively, the respective position can have an associated image that was captured from the respective position.

A first step of the method comprises delivering a number of stored images. The number of images delivered may be a subset of all the stored images, or else can include the total number of stored images. The total number of stored images includes all the stored images for all the practiced trajectories. If only a subset of all the images is delivered, this subset is selected from all the images on the basis of predetermined selection criteria. By way of example, only one image, in particular the image of the respective target position, or two images, in particular the image of the respective starting position and target position, can be selected for each trajectory. Furthermore, the subset can be selected, by way of example, on the basis of current position information pertaining to the vehicle and position information stored for each of the images, only those images that are situated close to the current position being selected. "Close" means that a distance from the current position to that of the image is less than or equal to a predetermined threshold.

A second step comprises determining a display that includes the delivered images to represent the respective associated trajectory. The display can be regarded as a graphical user interface in which the delivered images are arranged in a predetermined manner. By way of example, the display includes the images in a list arrangement or a table arrangement. There is also the possibility of a schematic display of the recorded pathway from a bird's eye view. Besides the images, the display can contain other elements, objects and/or information, in particular a numbering of the trajectories, a marking of individual images as a starting position or target position, graphic elements to subdivide and differentiate images of different trajectories from one another and suchlike.

The display can include dynamic elements, such as for example an animation comprising multiple images for a respective trajectory that are displayed at a specific position in the display sequentially in time.

The display may be optimized for output on the display device of the user interface. This means in particular that the display has a width and/or height that can be displayed on the display device without additional scaling.

The display can include multiple different subdisplays, such as for example providing different zoom levels for the images. This permits detailed display of the images, which may be advantageous in particular for display devices that have only a low resolution.

The display may have in particular a greater height than can be displayed in a visual display on the display device, in which case scrolling through the display is possible, for example.

A third step comprises outputting the determined display to the display device of the user interface of the vehicle. In particular, the display is transmitted to the display device in the form of an image signal, preferably a digital image signal. The display device receives the image signal and outputs a corresponding image on its visual display. In other words, the display device displays the display. The display device comprises, for example, a screen, preferably a touch-sensitive screen.

A fourth step comprises receiving a user input to select at least one image contained in the display from the user interface. Since each of the images is associated with a trajectory, a selection of an image corresponds to a selection of the associated trajectory. By selecting the image, the user can thus select the trajectory that they would like to follow. This is possible in a particularly intuitive manner by means of a touch-sensitive screen that merely requires the user to touch the applicable image of the display on the display device.

The user input can be received from the user interface in particular in the form of coordinates with reference to the display. The display is in particular two-dimensional, and so each position in the display is clearly defined by two coordinates; these are pixel coordinates, for example. The user input then contains, for example, a coordinate tuple or a range of coordinates. From these coordinates, it is also possible to conclude which of the images of the display the user has selected.

A fifth step comprises initiating the autonomous travel of the vehicle along the trajectory associated with the selected image. This means that the parking assistance system controls the vehicle in such a way that it travels along the selected trajectory to the target position and comes to a standstill there.

In embodiments, the display device is a component part of the parking assistance system.

According to one embodiment of the method, the number of stored images for the respective trajectory includes at least one image of the respective target position.

In this embodiment, the display for each trajectory is determined in particular using the image of the target position.

The target position is in particular the easiest position on a respective trajectory for users to remember, which is why this embodiment affords a particularly high level of reliability for selection of the trajectory.

It should be noted that the image of the target position can include both an image recorded from the target position and an image recorded from a location in front of the target position. Recording in front of the target position, in particular, may be advantageous if the target position itself is situated close to a wall or other obstacles, since then an image from the target position, for example, does not provide a good overview.

In other embodiments, the number of stored images for the respective trajectory includes at least one image of the respective starting position and the respective target position.

According to another embodiment of the method, the number of stored images for the respective trajectory includes an image compiled from a plurality of individual images.

For example, the compiled image can include a wide-angle view compiled from multiple individual shots, each with a smaller angle of view. During compilation, various image processing steps can be carried out, in particular to equalize the individual images, to align an exposure and a contrast of the individual images and suchlike.

According to another embodiment of the method, the compiled image includes a bird's eye view of the respective position.

The bird's eye view can be produced in particular by distorting the perspective of images.

In embodiments, the compiled image includes a bird's eye view of the entire trajectory. By way of example, this is accomplished by first converting individual images at a respective position on the trajectory into a bird's eye view and then compiling these individual images into one image. Compilation is carried out in particular in accordance with the determination of a panoramic image from a plurality of individual images.

According to another embodiment of the method, said method comprises:

- delivering an object to represent a position of the vehicle in the target position on the respective trajectory, and
- determining the display by using the delivered object, so that the object in the display is overlaid at the target position in an image in which the target position can be seen.

For example, the object to represent the position of the vehicle includes a projection of an outline of the vehicle in the target position on the ground. Thus, if the image of the target position shows the target position, the outline of the vehicle on the ground is inserted into this image. This can be accomplished, for example, in the form of a darkened area, or in the form of a contour that is inserted into the image.

In this context, "object" is understood to mean in particular a graphic object that can be displayed in a graphical display, in particular the image.

According to another embodiment of the method, said method comprises:

- determining a digital environment map for the respective trajectory, and
- determining the display by using the determined digital environment map, so that the determined digital environment map is displayed together with the delivered image for the respective trajectory, wherein the image is arranged in the display on the basis of the position of said image in the digital environment map.

The digital environment map includes in particular a digital display or representation of the environment of the vehicle, with, for example, detected objects, such as buildings or vegetation, being displayed in the map. The digital environment map can be determined on the basis of captured environment sensor data of various environment sensors, such as camera, lidar, radar and/or ultrasound. This can also be referred to as sensor fusion.

The digital environment map for the respective trajectory is determined in particular while the trajectory is being taught in the training mode.

The image being arranged in the display on the basis of the position of said image in the digital environment map is understood to mean in particular that each image in the digital environment map is arranged in such a way that a relative position of objects in the digital environment map and an object visible in the respective image corresponds to the relative position of these objects in reality. Simply put, this means that an image that corresponds to a target position next to a house is also arranged next to the house in the display of the digital environment map.

It can also be said that the position of the respective image depends on and is derived from the position of objects visible in the image.

If multiple images are delivered for the trajectory, all the delivered images may be arranged in the display in a manner commensurate with the digital environment map.

According to another embodiment of the method, the number of taught trajectories includes at least two trajectories whose paths are in the same area, wherein the display is determined in such a way that the respective images of the at least two trajectories are displayed in a group.

For example, the paths of the two trajectories being in the same area is understood to mean that the distance between a first position on the first trajectory and a second position on the second trajectory is less than a predetermined threshold value. The predetermined threshold value is, for example, 50 m, 30 m, 10 m or 5 m. Preferably, the positions are present in particular in a world coordinate system. For example, the two positions that are at the shortest distance from one another can be used for this determination.

The trajectories being displayed in a group is understood to mean in particular that said trajectories are contained in the display in a manner graphically differentiated from other trajectories. There may also be provision for the trajectories to be displayed in a combined manner, with for example a placeholder, such as a symbol or an icon, being displayed instead of the images. Selecting the placeholder allows another display to be called that contains the trajectories in a manner represented by their respective images.

According to another embodiment of the method, the number of taught trajectories includes at least two trajectories whose paths are in the same area, and comprising:

determining a common digital environment map for the at least two trajectories, and determining the display by using the determined common digital environment map, so that the common determined digital environment map is displayed together with the respective delivered image for the respective trajectory, wherein the respective image is arranged in the display on the basis of the position of said image in the digital environment map.

This embodiment is particularly advantageous if the paths of multiple trajectories are in the same area, since then the risk of confusion is also particularly high. The spatial display using the digital environment map makes it particularly intuitive for the user to select the right trajectory in a specific situation, even if they have not taught the trajectory themselves.

According to another embodiment of the method, the number of images associated with the respective trajectory is captured and stored while the trajectory is being taught in the training mode.

According to another embodiment of the method, new images are captured by the on-board camera and associated with the respective trajectory and stored while the trajectory is being followed in the follow mode.

This is advantageous to take account of changes in the environment over time in the images. The new images can replace all or some of the original images. This may also be advantageous if the original training run was carried out in poor visibility conditions, such as in darkness, rain, snow and/or with a dirty camera lens, this being the reason why the stored images are of poor quality.

According to another embodiment of the method, the respective number of images is captured by a number of cameras, the number including a front camera, a rear camera, a side camera on a left-hand side of the vehicle and/or a side camera on a right-hand side of the vehicle.

According to another embodiment of the method, each stored image has associated position information with reference to a world coordinate system, and the display is determined in such a way that the respective image is arranged relative to other images on the basis of its associated position in the world coordinate system.

A world coordinate system is understood herein to mean that all the coordinates, in particular also those of different trajectories, refer to the same reference point (origin). One such world coordinate system is, for example, the coordinate systems provided by a satellite navigation system, such as NAVSTAR GPS, GALILEO, GLONASS and/or Beidou.

In this embodiment, the display can include, for example, a street map in which the images for the trajectories are overlaid. This enables any user of the vehicle to quickly and intuitively ascertain where a practiced trajectory is present.

According to a second aspect, a computer program product is proposed that comprises commands that, when the program is executed by a computer, cause said computer to carry out the method according to the first aspect.

The computer is in particular a component part of a vehicle and forms, for example, an electronic control unit (ECU).

A computer program product, such as e.g. a computer program means, can, for example, be delivered or supplied as a storage medium, such as e.g. a memory card, a USB stick, a CD-ROM, a DVD, or in the form of a downloadable file from a server in a network. This can be accomplished, for example, in a wireless communication network by transmitting a corresponding file containing the computer program product or the computer program means.

According to a third aspect, a parking assistance system for a vehicle is proposed. In a follow mode the parking assistance system is configured to autonomously follow a trajectory from a number of trajectories taught in a training mode, wherein the respective trajectory is defined by a sequence of positions and connects a starting position to a target position, and wherein the respective trajectory has an associated and stored number of images, captured by an on-board camera, of an environment of the vehicle at the respective position. The parking assistance system comprises:

a delivery unit to deliver a number of stored images, a determination unit to determine a display that includes the delivered images to represent the respective associated trajectory, an output unit to output the determined display to a display device of the user interface to display the delivered images, a receiving unit to receive a user input to select at least one image contained in the display from the user interface, and a control unit to initiate an autonomous travel of the vehicle along the trajectory associated with the selected image.

This parking assistance system has the same advantages as are explained for the method according to the first aspect. The embodiments and features described for the proposed method apply mutatis mutandis to the proposed parking assistance system.

The respective unit of the parking assistance system may be hardware-implemented and/or software-implemented. In a hardware implementation, the respective unit may be, for example, in the form of a computer or in the form of a microprocessor. In a software implementation, the respective unit may be in the form of a computer program product, in the form of a function, in the form of a routine, in the form of an algorithm, in the form of part of a program code or in the form of an executable object. Furthermore, each of the units mentioned herein may also be in the form of part of a superordinate control system of the vehicle, such as for example a central electronic control device and/or a control unit (ECU: Electronic Control Unit).

The parking assistance system is configured in particular to carry out the method according to the first aspect.

According to a fourth aspect, a vehicle having a number of cameras to capture a respective image of an environment of the vehicle, having a parking assistance system according to the third aspect, and having a user interface comprising a display device is proposed.

The vehicle is, for example, a passenger car or a truck. The vehicle preferably comprises a number of sensor units that are configured to detect the driving state of the vehicle and to sense an environment of the vehicle. Examples of such sensor units of the vehicle are image recording devices, such as a camera, a radar (radio detection and ranging) or a lidar (light detection and ranging), ultrasonic sensors, location sensors, wheel angle sensors and/or wheel speed sensors. The sensor units are each configured to output a sensor signal, for example to the parking assistance system, which carries out semiautonomous or fully autonomous control of the vehicle on the basis of the acquired sensor signals.

The number of cameras includes a front camera, a rear camera, a side camera on a left-hand side of the vehicle and/or a side camera on a right-hand side of the vehicle.

Further possible implementations of the invention also include combinations not explicitly mentioned of features or embodiments described hereinabove or hereinbelow with respect to the exemplary embodiments. A person skilled in the art will also add individual aspects as improvements or supplementations to the respective basic form of the invention.

Further advantageous configurations and aspects of the invention are the subject of the subclaims and also of the exemplary embodiments of the invention that are described hereinbelow. The invention is explained in more detail below on the basis of preferred embodiments with reference to the accompanying figures.

In the figures, identical or functionally identical elements have been provided with the same reference signs, unless indicated otherwise.

Figure 1:
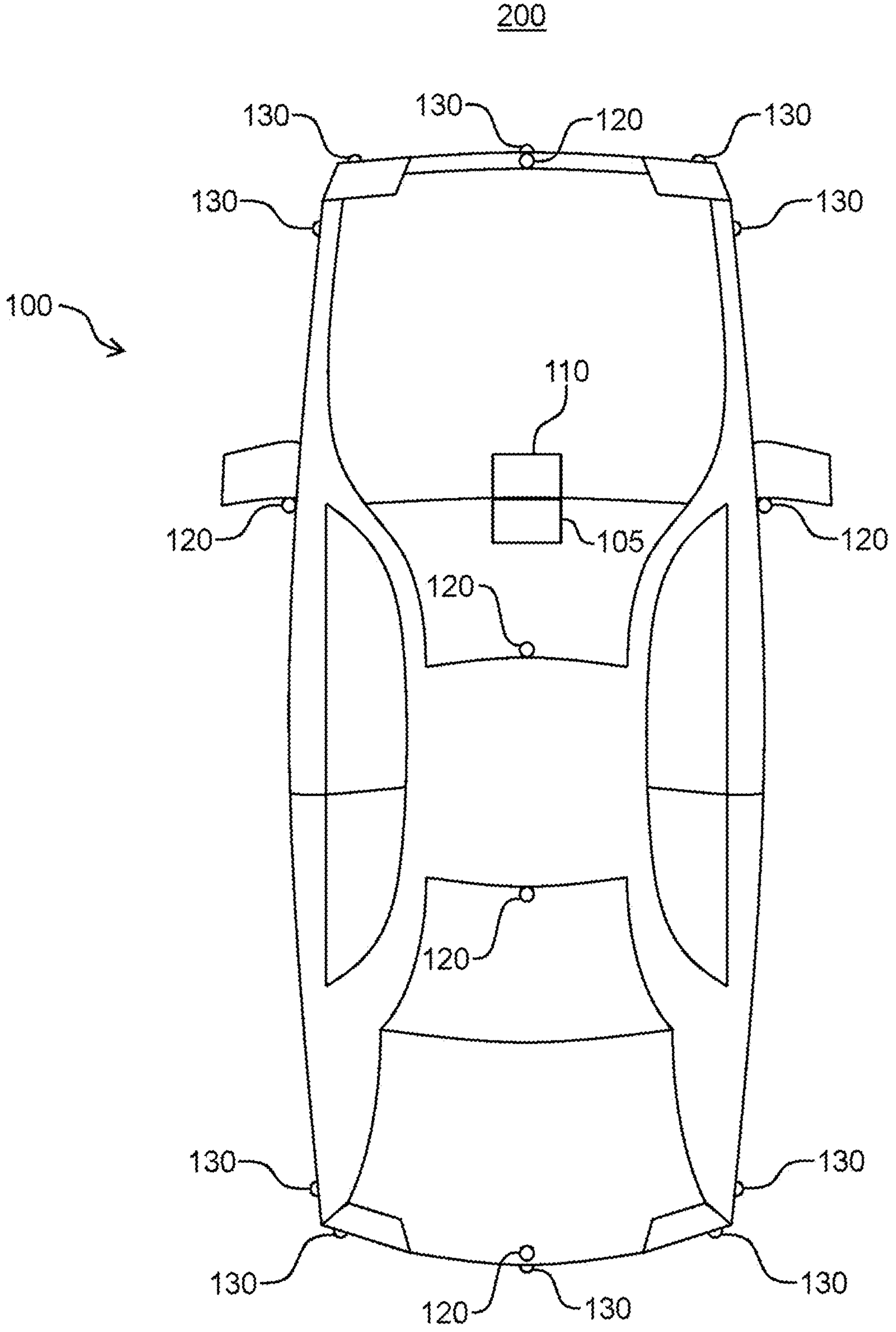
FIG. 1 shows a schematic bird's eye view of a vehicle.

FIG. 1 shows a schematic bird's eye view of a vehicle 100. The vehicle 100 is, for example, an automobile arranged in an environment 200. The automobile 100 has a parking assistance system 110, which, for example, is in the form of a control unit. Moreover, a plurality of environment sensor devices 120, 130 are arranged on the automobile 100, these being, by way of illustration, optical sensors 120 and ultrasonic sensors 130. The optical sensors 120 include, for example, visual cameras, a radar and/or a lidar. The optical sensors 120 can in particular each capture an image of a respective area from the environment 200 of the automobile 100 and output said image as an optical sensor signal. The ultrasonic sensors 130 are configured to measure a distance from objects arranged in the environment 200 and to output a corresponding sensor signal. By means of the sensor signals acquired from the sensors 120, 130, the parking assistance system 110 is able to drive the automobile 100 semiautonomously or fully autonomously. Besides the optical sensors 120 and ultrasonic sensors 130 depicted in FIG. 1, there can be provision for the vehicle 100 to have various other sensor devices 120, 130. Examples of these are a wheel speed sensor, a steering angle sensor, a position sensor, a microphone, an acceleration sensor, an antenna with a coupled receiver to receive electromagnetically transmissible data signals, and suchlike.

The vehicle also has a user interface 105, the parking assistance system 110 being communicatively coupled to the user interface 105. This means that the parking assistance system 110 and the user interface 105 are configured to interchange data, in particular in the form of analog or digital data signals. The user interface 105 comprises a display device (not shown) that is configured to display images IMG1-IMG6 (see FIGS. 2-5) and a display DSP (see FIGS. 2-5). Furthermore, the user interface 105 comprises input means (not shown) that a user of the vehicle 100 can use to make inputs into systems of the vehicle 100, in particular into the parking assistance system 110. The input means can include buttons, switches, rotary controls, touch-sensitive elements, voice detection, gesture detection and suchlike. A respective input can relate in particular to elements that are displayed by the display device at a specific time.

In a follow mode the parking assistance system 110 is configured to autonomously follow a trajectory TR1-TR4 (see FIG. 4 or 5) from a number of trajectories TR1-TR4 taught in a training mode. The respective trajectory TR1-TR4 is defined by a sequence of positions P1-P6 (see FIG. 4) and connects a starting position P1 to a target position P6. Each of the trajectories TR1-TR4 has an associated and stored number of images IMG1-IMG6, captured by an on-board camera 120, of the environment 200 of the vehicle 100. The respective image IMG1-IMG6 is recorded when the vehicle 100 is at a respective position P1-P6 on the trajectory TR1-TR4, and it therefore shows a corresponding detail from the environment 200. In embodiments, a respective image IMG1-IMG6 can contain image information from multiple images IMG1-IMG6, in particular it may be a merged image. The parking assistance system 110 is designed as depicted in FIG. 6, for example, and is configured to carry out the method explained with reference to FIG. 7.

Figure 2:
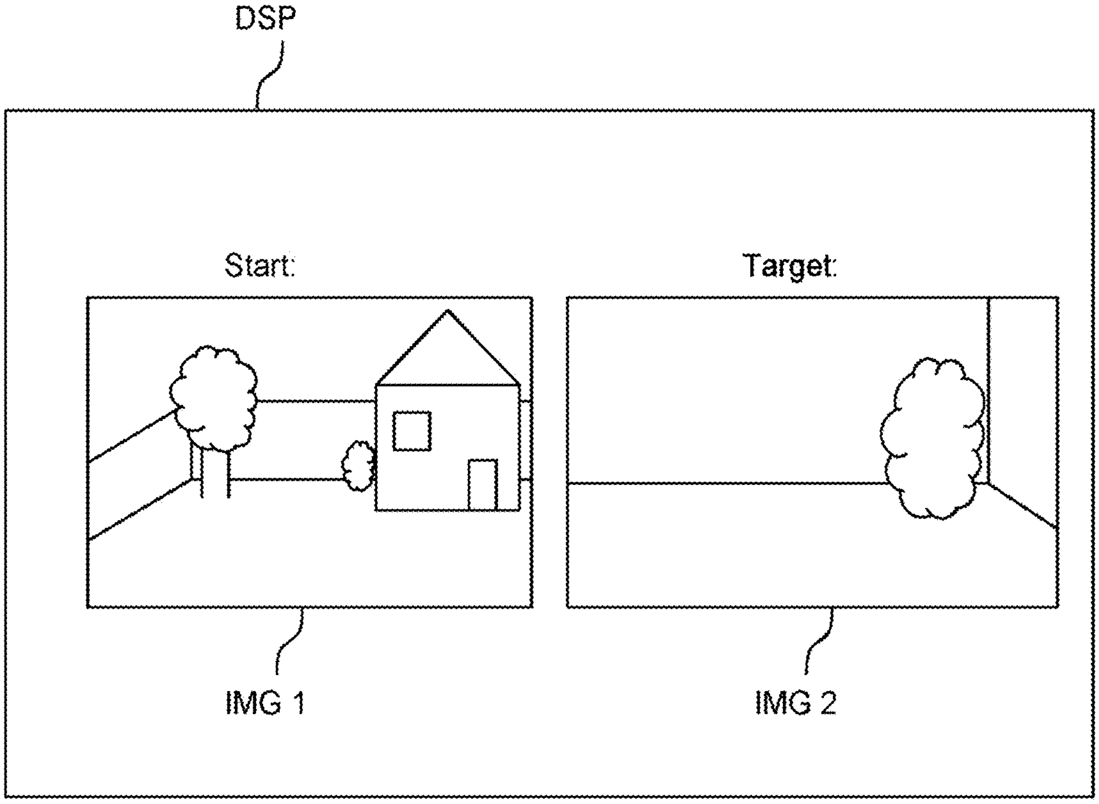
FIG. 2 shows a schematic view of a display comprising two images.

FIG. 2 shows a schematic view of a display DSP comprising two images IMG1, IMG2. The display DSP is determined in particular by the determination unit 112 (see FIG. 6) on the basis of a number of images IMG1-IMG6 delivered by the delivery unit 111 (see FIG. 6).

The two images IMG1, IMG2 are associated with a taught trajectory TR1-TR4 (see FIG. 4 or 5) that the user has driven along, for example, with the vehicle 100 of FIG. 1, the parking assistance system 110 (see FIG. 1 or 6) having recorded the trajectory TR1-TR4. In this example, the images IMG1, IMG2 show a view of the environment 200 (see FIG. 1) of the vehicle 100 as seen from a starting position P1 (see FIG. 4) (IMG1 headed "Start:") and another view of the environment 200 of the vehicle 100 as seen from a target position P6 (see FIG. 4) (IMG2 headed "Target:"), the images IMG1, IMG2 having been captured, for example, by a front camera 120. It should be noted that instead of the image IMG2 as seen from the target position P6 an image as seen from a position in front of the target position P6 is advantageously used to display the target position P6, since such an image affords a better overview and in particular includes the target position P6 itself (see also FIG. 3 in this regard).

In the first image IMG1 it is possible to see a view of a house with a fence or a wall in the background, and also a tree and a bush next to the house. In the second image IMG2 it is possible to see only the bush and portions of a house wall and also the fence. In this example, the user has used the vehicle 100 to practice in particular the trajectory TR1 displayed in FIG. 4, and so the parking assistance system 110 is now able to drive the vehicle 100 autonomously from the starting position P1 to the target position P6.

The display DSP is transmitted from the output unit 114 (see FIG. 6) of the parking assistance system 110 to the user interface 105 (see FIG. 1), and the user interface 105 displays the display DSP on the display device. This enables the user to intuitively ascertain the trajectory TR1 associated with the images IMG1, IMG2, and they can select said trajectory to follow. It should be noted that in embodiments the display DSP contains only one image for the trajectory TR1, or else contains more than two images for the trajectory TR1 and/or contains compiled images for the trajectory TR1 (see also FIG. 4 in this regard).

If the parking assistance system 110 includes multiple practiced and stored trajectories TR1-TR4, a corresponding display DSP can be determined and output for each further trajectory TR1-TR4, and so the user can select the desired trajectory TR1-TR4 on the basis of the respective images IMG1, IMG2.

It should be noted that the display DSP can contain corresponding images IMG1, IMG2 for multiple trajectories TR1-TR4, these being arranged, for example, simultaneously next to or beneath one another in the display DSP (not shown).

For example, when the user selects the trajectory TR1, the user interface 105 sends a corresponding user input to the parking assistance system 110, said parking assistance system initiating autonomous following of the selected trajectory TR1.

Figure 3:
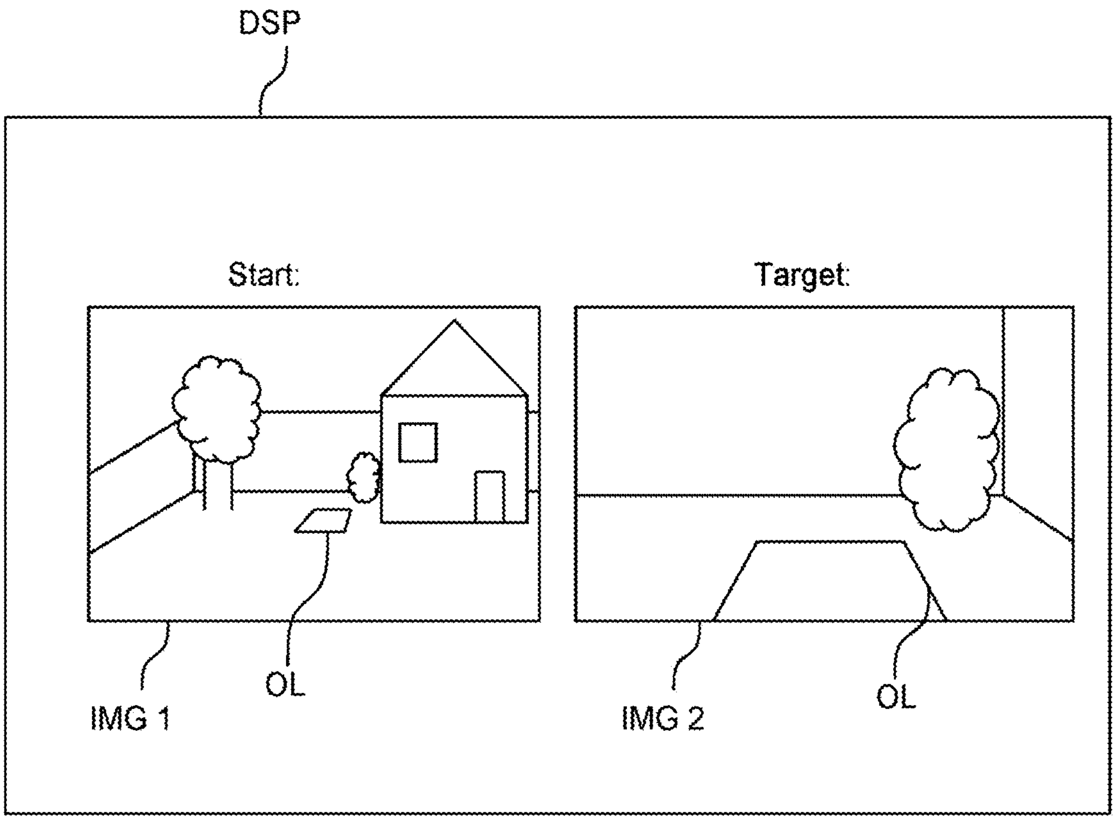
FIG. 3 shows another schematic view of a display comprising two images.

FIG. 3 shows another schematic view of a display DSP comprising two images IMG1, IMG2. The display DSP is determined in particular by the determination unit 112 (see FIG. 6) on the basis of a number of images IMG1-IMG6 delivered by the delivery unit 111 (see FIG. 6).

The display of FIG. 3 almost corresponds to that of FIG. 2, one difference being that the images IMG1, IMG2 additionally show an object OL. For example, the object OL is a geometric figure (a rectangle depicted with perspective distortion) that is inserted into or overlaid on the respective image IMG1, IMG2. The object OL is inserted into the image in particular at a position that corresponds to the target position P6 (see FIG. 4) on the trajectory TR1, that is to say the position of the vehicle 100 when it has travelled along the trajectory TR1.

In this example, the second image IMG2 is recorded from a position in front of the target position P6, that is to say, for example, the position P5 (see FIG. 4), this being the reason why the target position P6 is contained in the image IMG2.

Due to the additional overlay of the target position P6 in the displayed images IMG1, IMG2, the user can associate the trajectory TR1 even better and is in particular able to distinguish trajectories that end, for example, in adjacent parking spaces, and for which the displayed images are therefore almost identical, from one another.

It should be noted that, as an alternative to the display DSP in FIG. 3, the object OL is overlaid only on one of the images IMG1, IMG2, for example.

Figure 4:
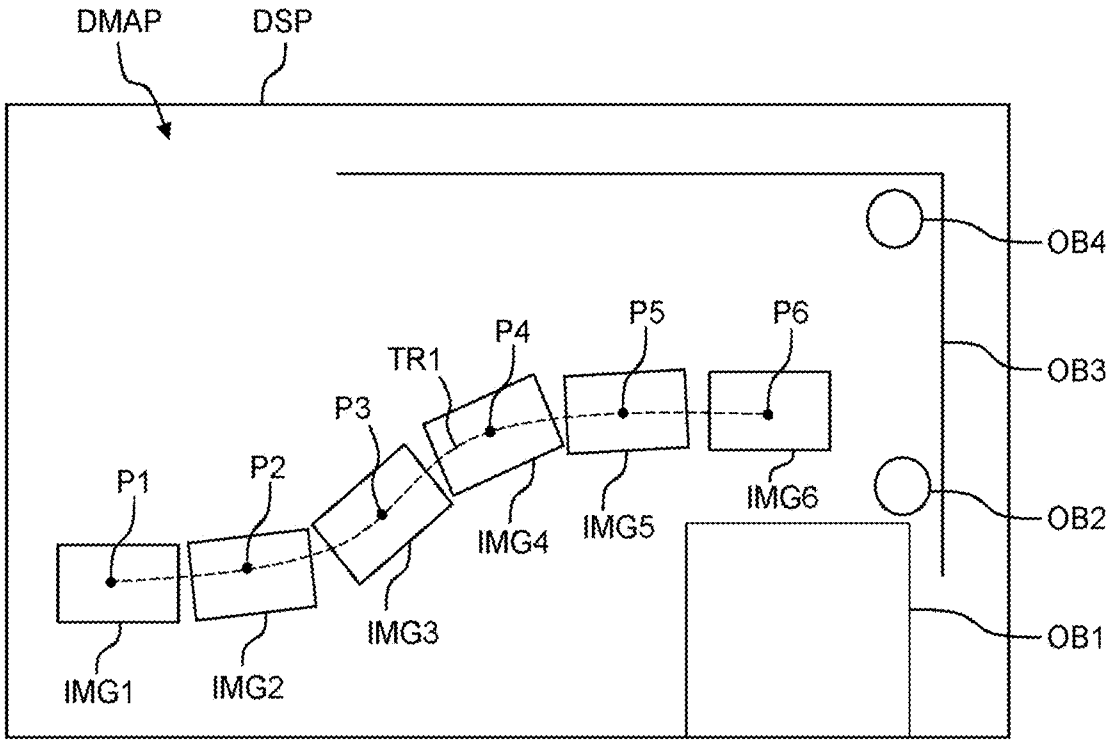
FIG. 4 shows a schematic view of a display comprising a digital environment map.

FIG. 4 shows a schematic view of a display DSP comprising a digital environment map DMAP and a plurality of images IMG1-IMG6, which are associated with the trajectory TR1. For example, the environment displayed in the digital environment map DMAP is the same as that displayed in the images IMG1, IMG2 of FIGS. 2 and 3. In the digital environment map DMAP, the detected objects OB1-OB4 are displayed in accordance with the environment. In this example, they are the house OB1, the bush OB2, the fence OB3 and the tree OB4. The digital environment map DMAP is preferably acquired and stored when the trajectory TR1 is practiced.

In this example, the trajectory TR1 comprises six positions P1-P6, position P1 being the starting position and position P6 being the target position. For example, the starting position P1 is situated in front of the house (displayed here as object OB1) and the target position P6 is situated next to the house OB1, at the side. At each position P1-P6, at least one image IMG1-IMG6 of the environment was captured, associated with the trajectory TR1 and stored during training. The images IMG1-IMG6 are preferably compiled images that show a bird's eye view of the respective position. This is possible in particular if the vehicle 100 comprises multiple cameras 120 that can capture an angle of view of 360° in total around the vehicle 100. Even if the vehicle 100 has only one front camera 120, however, the images from the front camera 120 can be converted into a view from above by suitably distorting the perspective of said images. It should be noted that a respective image IMG1-IMG6 was not necessarily captured when the vehicle 100 was at the corresponding position. Rather, the image IMG3 was captured by the front camera, for example, when the vehicle 100 was at position P2, and mutatis mutandis for the other images/positions.

In this example, the display includes both the digital environment map DMAP and images IMG1-IMG6 that are associated with the trajectory TR1 and are used to display the trajectory TR1. The images IMG1-IMG6 are arranged in the digital environment map of the display DSP in particular in a manner corresponding to reality. The overlaid display of the images IMG1-IMG6 together with the digital environment map DMAP allows the user to ascertain the trajectory TR, in particular the target position P6 on the trajectory TR1, even better.

If the images IMG1-IMG6 are close enough together and/or overlap, they can also be merged to produce a single image and stored.

In embodiments, the trajectory TR1 can also be inserted into the display DSP in the form of an object OL (see FIG. 3).

Figure 5:
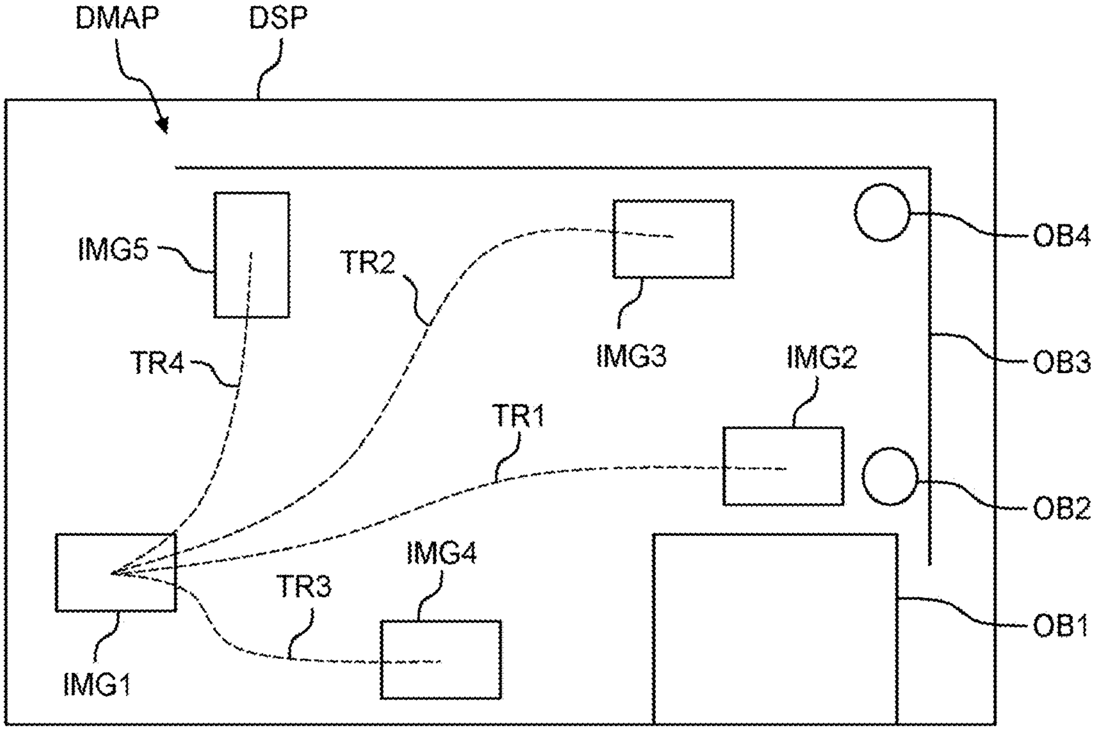
FIG. 5 shows another schematic view of a display comprising a digital environment map.
Figure 6:
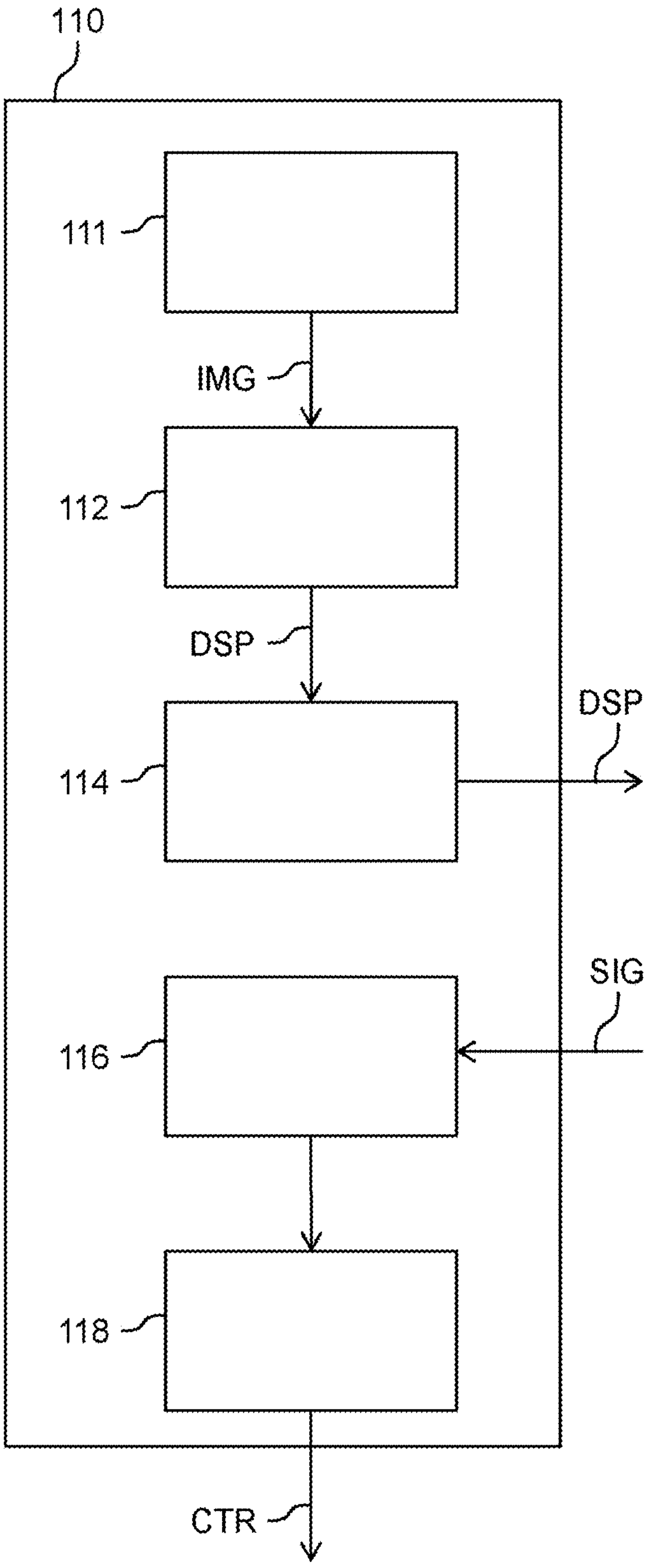
FIG. 6 shows a schematic block diagram of an exemplary embodiment of a parking assistance system.

FIG. 5 shows another schematic view of a display DSP comprising a digital environment map DMAP. For example, this involves the same environment 200 as has already been explained in FIG. 4. In this example, however, there are multiple trajectories TR1-TR4 in the displayed area of the environment. By way of example, the different trajectories TR1-TR4 were practiced by different users of the vehicle 100. In this example, all the trajectories TR1-TR4 begin at the starting position displayed by the image IMG1, but this is not imperative.

The respective image IMG2-IMG5 of the respective target position is arranged in the display DSP with reference to the digital environment map DMAP, in particular the objects OB1-OB4, in a manner corresponding to reality, which makes it considerably easier for the user to derive a position of the vehicle in reality from the displayed target position.

For example, the user can select one of the images IMG2-IMG5 in the display DSP in order to select the associated trajectory TR1-TR4.

In embodiments, a respective object OL (see FIG. 3) for each trajectory TR1-TR4 can also be inserted into the display DSP.

FIG. 6 shows a schematic block diagram of an exemplary embodiment of a parking assistance system 110 that can be used, for example, with the vehicle 100 of FIG. 1. In a follow mode the parking assistance system 110 is configured to autonomously follow a trajectory TR1-TR4 (see FIG. 4 or 5) from a number of trajectories TR1-TR4 taught in a training mode. The respective trajectory TR1-TR4 is defined by a sequence of positions P1-P6 (see FIG. 4) and connects a starting position P1 to a target position P6. Each of the trajectories TR1-TR4 has an associated and stored number of images IMG1-IMG6 (see FIGS. 2-6), captured by an on-board camera 120 (see FIG. 1), of the environment 200 (see FIG. 1) of the vehicle 100. The respective image IMG1-IMG6 is recorded when the vehicle 100 is at a respective position P1-P6 on the trajectory TR1-TR4, and it therefore shows a corresponding detail from the environment 200. The parking assistance system 110 comprises a delivery unit 111 to deliver a number of stored images IMG, a determination unit 112 to determine a display DSP that includes the delivered images IMG to represent the respective associated trajectory TR1-TR4 (see FIG. 4 or 5), an output unit 114 to output the determined display DSP to a display device of the user interface 105 (see FIG. 1), in particular in the form of a digital image or data signal, a receiving unit 116 to receive a user input SIG to select at least one image IMG contained in the display DSP from the user interface 105, and a control unit 118 to initiate an autonomous travel of the vehicle 100 along the trajectory TR1-TR4 associated with the selected image IMG. In this example, the control unit 118 outputs a corresponding control signal CTR.

The respective unit 111-118 of the parking assistance system 110 may be hardware-implemented and/or software-implemented. In a hardware implementation, the respective unit 111-118 may be, for example, in the form of a computer or in the form of a microprocessor. In a software implementation, the respective unit 111-118 may be in the form of a computer program product, in the form of a function, in the form of a routine, in the form of an algorithm, in the form of part of a program code or in the form of an executable object. Furthermore, each of the units 111-118 mentioned herein may also be in the form of part of a superordinate control system of the vehicle, such as for example a central electronic control device and/or a control unit (ECU: Electronic Control Unit).

In embodiments, the display device and/or the user interface 105 is part of the parking assistance system 110 (not shown).

Figure 7:
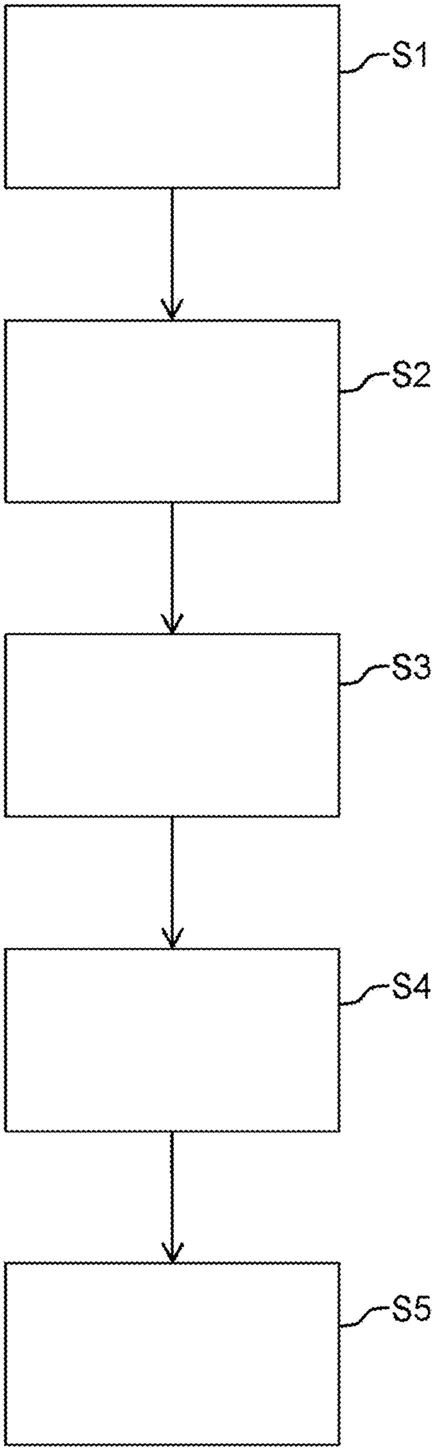
FIG. 7 shows a schematic block diagram of an exemplary embodiment of a method for operating a parking assistance system.

FIG. 7 shows a schematic block diagram of an exemplary embodiment of a method for operating a parking assistance system 110 for a vehicle 100, in particular the parking assistance system 110 depicted in FIG. 6 and the vehicle 100 depicted in FIG. 1. In a follow mode the parking assistance system 110 is configured to autonomously follow a trajectory TR1-TR4 (see FIG. 4 or 5) from a number of trajectories TR1-TR4 taught in a training mode, wherein the respective trajectory TR1-TR4 is defined by a sequence of positions P1-P6 (see FIG. 4) and connects a starting position P1 to a target position P6, and wherein the respective trajectory TR1-TR4 has an associated and stored number of images IMG1-IMG6 (see FIGS. 2-6), captured by an on-board camera 120 (see FIG. 1), of an environment 200 (see FIG. 1) of the vehicle 100 at the respective position P1-P6. A first step S1 comprises delivering a number of stored images IMG1-IMG6. A second step S2 comprises determining a display DSP (see FIGS. 2-5) that includes the delivered images IMG1-IMG6 to represent the respective associated trajectory TR1-TR4, a third step S3 comprises outputting the determined display DSP to a display device of a user interface 105 (see FIG. 1) of the vehicle 100, a fourth step S4 comprises receiving a user input SIG (see FIG. 6) to select at least one image IMG1-IMG6 contained in the display DSP from the user interface 105, and a fifth step S5 comprises initiating an autonomous travel of the vehicle 100 along the trajectory TR1-TR4 associated with the selected image IMG1-IMG6.

Although the present invention has been described on the basis of exemplary embodiments, it can be modified in many ways.

LIST OF REFERENCE SIGNS

100 vehicle
105 user interface
110 parking assistance system
111 delivery unit
112 determination unit
114 output unit
116 receiving unit
118 control unit
120 environment sensor device
130 environment sensor device
200 environment
CTR control signal
DMAP digital environment map
DSP display
IMG1 image
IMG2 image
IMG3 image
IMG4 image
IMG5 image
IMG6 image
OB1 object
OB2 object
OB3 object
OB4 object
OL object
P1 position
P2 position
P3 position
P4 position
P5 position
P6 position
S1 method step
S2 method step
S3 method step
S4 method step
S5 method step
SIG user input
TR1 trajectory
TR2 trajectory
TR3 trajectory
TR4 trajectory

The invention claimed is:

1. A method for operating a parking assistance system for a vehicle, wherein in a follow mode the parking assistance system is configured to autonomously follow a trajectory from a number of trajectories taught in a training mode, wherein the respective trajectory is a sequence of positions and connects a starting position to a target position, and wherein the respective trajectory has an associated and stored number of images, captured by an on-board camera, of an environment of the vehicle at the respective position, the method comprising:

delivering a number of stored images, determining a display that includes the delivered images to represent the respective associated trajectory, outputting the determined display to a display device of a user interface of the vehicle, receiving a user input to select at least one image contained in the display from the user interface; and initiating an autonomous travel of the vehicle along the trajectory associated with the selected image.

2. The method as claimed in claim 1, wherein the number of stored images for the respective trajectory includes at least one image of the respective target position.

3. The method as claimed in claim 1, wherein the number of stored images for the respective trajectory includes an image compiled from a plurality of individual images.

4. The method as claimed in claim 3, wherein the compiled image includes a bird's eye view of the respective position.

5. The method as claimed in claim 1, further comprising:
delivering an object to represent a position of the vehicle in the target position on the respective trajectory; and
determining the display by using the delivered object, so that the object in the display is overlaid at the target position in an image in which the target position can be seen.

6. The method as claimed in claim 1, further comprising:
determining a digital environment map for the respective trajectory; and
determining the display by using the determined digital environment map, so that the determined digital environment map is displayed together with the delivered image for the respective trajectory,
wherein the image is arranged in the display on the basis of the position of said image in the digital environment map.

7. The method as claimed in claim 1,
wherein the number of taught trajectories includes at least two trajectories whose paths are in the same area,
wherein the display is determined in such a way that the respective images of the at least two trajectories are displayed in a group.

8. The method as claimed in claim 1,
wherein the number of taught trajectories includes at least two trajectories whose paths are in the same area, and
the method further comprising:
determining a common digital environment map for the at least two trajectories; and
determining the display by using the determined common digital environment map, so that the determined common digital environment map is displayed together with the respective delivered image for the respective trajectory,
wherein the respective image is arranged in the display on the basis of the position of said image in the digital environment map.

9. The method as claimed in claim 1, wherein the number of images associated with the respective trajectory is captured and stored while the trajectory is being taught in the training mode.

10. The method as claimed in claim 1, wherein new images are captured by the on-board camera and associated with the respective trajectory and stored while the trajectory is being followed in the follow mode.

11. The method as claimed in claim 1, wherein the respective number of images is captured by a number of cameras, the number including a front camera, a rear camera, a side camera on a left-hand side of the vehicle and/or a side camera on a right-hand side of the vehicle.

12. The method as claimed in claim 1,
wherein each stored image has associated position information with reference to a world coordinate system, and
wherein the display is determined in such a way that the respective image is arranged relative to other images on the basis of its associated position in the world coordinate system.

13. A non-transitory computer program product comprising commands that,
when the program is executed by a computer, cause said computer to carry out the method as claimed in claim 1.

14. A parking assistance system for a vehicle,
wherein in a follow mode the parking assistance system is configured to autonomously follow a trajectory from a number of trajectories taught in a training mode,
wherein the respective trajectory is a sequence of positions and connects a starting position to a target position, and
wherein the respective trajectory has an associated and stored number of images, captured by an on-board camera, of an environment of the vehicle at the respective position,
the parking assistance system comprising:
a delivery unit configured to deliver a number of stored images,
a determination unit to determine a display that includes the delivered images configured to represent the respective associated trajectory,
an output unit configured to output the determined display to a display device of a user interface of the vehicle,
a receiving unit configured to receive a user input to select at least one image contained in the display from the user interface; and
a control unit configured to initiate an autonomous travel of the vehicle along the trajectory associated with the selected image.

15. A vehicle having a number of cameras to capture a respective image of an environment of the vehicle, having a parking assistance system as claimed in claim 14 and having a user interface comprising a display device.

* * * * *